United States Patent Office 3,788,989
Patented Jan. 29, 1974

3,788,989
MICROBIOCIDAL NAPHTHENYL IMIDAZOLINES
Phillip Adams, Murray Hill, and Alfonso N. Petrocci, Glen Rock, N.J., assignors to Millmaster Onyx Corporation, New York, N.Y.
No Drawing. Continuation-in-part of application Ser. No. 883,641, Dec. 9, 1969, now Patent No. 3,705,027. This application June 16, 1972, Ser. No. 263,682
The portion of the term of the patent subsequent to Dec. 5, 1989, has been disclaimed
Int. Cl. C10m 1/40
U.S. Cl. 252—33         1 Claim

ABSTRACT OF THE DISCLOSURE

A method of preserving metal-working fluids against microorganisms by adding the compound 1-aminoethyl-2-naphthenyl imidazoline, having the structure:

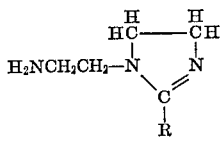

wherein R is the residue of naphthene-carboxylic acid as a microbiocidal preservative agent.

---

This is a continuation-in-part of co-pending application Ser. No. 883,641, filed Dec. 9, 1969 and now U.S. Pat. No. 3,705,027.

This invention relates to the microbiocidal use of 1-aminoethyl-2-naphthenyl imidazoline, having the structure:

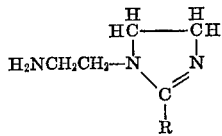

wherein R is the residue of a naphthene-carboxylic acid.

It has been discovered that the above naphthenyl imidazolines have a high order of microbiocidal effectiveness which is greatly superior to other imidazolines having different acid residues.

The compounds of this invention and their salts in addition to being useful as preservatives for industrial water, either as a coolant, as in cooling towers, air-conditioners, humidifiers and the like; or for process water, as in paper manufacture to prevent slime formation and the like, are also useful in flooding for secondary oil recovery, to prevent clogging of the sands by the growth of microorganisms, and as preservatives for metal-working lubricants, such as cutting and grinding fluids, where they prevent microbial decomposition which causes breaking of emulsions, putrefaction and the incidence of dermatitis resulting from the handling of contaminated or "spoiled" lubricants.

They are further utilizable to preserve cosmetics so as to prevent phase separation, discoloration and other effects of microbial proliferation, including that of pathogenic strains of microorganisms which may cause serious or minor infection of the skin or mucosa.

These compounds may also be used to preserve jet-fuels from microbial growth which may result in the clogging of nozzles; similarly, they may be used as preservatives in fuel oils to prevent corrosion of tanks, lines and the like.

Naphthenic acids are well known to the art and are available commercially, primarily as the result of various extractive procedures carried out in refining naturally occurring petroleums and petroleum fractions, particularly gas-oil distillates boiling in the range of 400–700° F. Naphthenic acids are found particularly in petroleums originating in the western part of the United States, especially in California; in the northern part of South America, especially Venezuela, Columbia and Aruba; in the southern part of Europe, especially Rumania, and, to a lesser extent, in crude oils originating in Louisiana, along the Texas gulf coast, in Peru, Mexico, Poland, the Soviet Union and Germany.

The chemical nature of these naphthenic acids is more or less ill-defined, but they all have in common the characteristic of possessing alicyclic nuclei. These may be five or six membered carbon atom ring systems, various condensed ring systems, and other related materials as disclosed in Fieser, "Organic Chemistry," 3rd ed. 1956, pages 97–98.

EXAMPLE 1

2,324 grams (or 9.28 mols) of Enjay's refined naphthenic acid having an acid number of 224, and 1,265 grams (or 12.07 mols) of diethylene triamine were charged into an agitated flask fitted with a packed fractionating column system for the purpose of separating and removing water formed in the reaction and returning stripped amine to the reactor. Aquametric titration of the charged amine indicated a water content of 1.17%.

The mixture was agitated and heated under reduced pressure at about 150° C. pot temperature and at 216 mm. pressure, gradually raising the pot temperature to about 200° C. during a period of about 12 hours. The water of reaction distilled along with some of the diethylene triamine, through the fractionating column, which stripped off the water and returned the amine to the reactor. When no more water distilled, the excess amine was distilled off at about 5 mm. pressure and 190° C.

The total amount of water collected was 321 grams; correcting for the initial water content, 17 mols of water was obtained, or 91.5% of the theoretical amount for the formation of the imidazoline.

A weighed sample was titrated potentiometrically to the first break with HCl in alcohol, indicating 87.4% activity. After reacting the non-tertiary nitrogen with phenyl isothiocyanate, titration with perchloric acid indicated 95.2% reaction.

The product was found to be effective against aerobic bacteria at from 25 to 150 parts per million at 37° C. during four hours.

EXAMPLE 2

The product was assayed bacteriologically by the Standard Broth Dilution Test Method. Aliquots of a solution of the aminoethyl naphthenyl imidazoline were added to appropriate broth culture media contained in test tubes, so that various concentrations were obtained. The tubes so prepared were inoculated with 24 hour broth cultures of the test bacteria, or 14 day aqueous spore suspensions of the test fungi, or 7 day broth cultures of the algae. The inoculated tubes were incubated as follows: bacterial for 72 hours at 37° C.; fungi for 14 days at 28° C.; algae for 7 days at 25° C. Following the aforementioned incubation periods the tubes were examined for the presence or absence of macroscopic growth. The lowest concentration of test material not permitting macroscopic growth is designated as Minimum Inhibitory Level.

The test organisms employed were: Escherichia coli= E.c.; Pseudomonas aeruginosa=Ps.a; Staphylococcus aureus=S.a.; Streptococcus faecalis=S.f.; Aspergillus niger=A.n.; Penicilium expansum=P.e.; and Clorella pyrenoidosa=C.p.

TABLE 1

Parts per million of 1-aminoethyl-2-naphthenyl imidazoline

Gram negative:
- E.c. — 10
- Ps.a — 250

Gram positive:
- S.a. — 10
- S.f. — 10

Fungi:
- A.n. — 500
- P.e. — 500

Algae: C.p. — 10

Cutting and grinding fluids and especially the water-soluble or water-dispersible types containing, for example, amine soaps, and salts of organic phosphate esters, tallow soaps, mahogany soaps and other hydrocarbon sulfonates, were effectively preserved against microbial action over a period of weeks by the addition of about 200 parts per million of the imidazoline in the lubricant as diluted for use. Examples of such use are illustrated as follows:

EXAMPLE 3

A microbiocidally preserved phosphate ester type of metal-working fluid, was formulated by homogeneously admixing at room temperature and pressure, the following components:

| Components: | Parts by weight |
|---|---|
| Antara "LS-500" phosphate ester | 10.0 |
| Triethanolamine | 20.0 |
| Sodium nitrite | 4.0 |
| 1-aminoethyl-2-naphthenyl imidazolin | 1.0 to 2.0 |
| Water | To make 100.0 |

Since variations in cutting fluid dilutions may differ, in accordance with specific uses, specific formulations may differ in the amount of preservative added in the concentrate in order to obtain a diluted fluid containing, prefreably, about 200 p.p.m. of the preservative.

EXAMPLE 4

Similarly, a petroleum sulfonate type of metal-working fluid was formulated by homogeneously mixing at room temperature and pressure, the following components:

| Components: | Parts by weight |
|---|---|
| Petroleum sulfonates: | |
| Humble Oil Co. "Acto 630" | 33.0 |
| Humble Oil Co. "Acto 639" | 33.0 |
| Mineral spirits (e.g. Humble's "Bayol 90") | 32.0–33.0 |
| 1-aminoethyl-2-naphthenyl imidazoline | 1.0–2.0 |

Here, too, the specific amount of the preservative will vary in accordance with the specific formulation.

This compound may be employed either as the free amine or as its salts of inorganic or organic acids. Such acids may include, for example, hydrochloric, sulfuric, phosphoric, acetic, lauric, oleic, gluconic, oxalic, tartaric, citric, benzoic and substituted benzoic, paratoluene sulfonic, sulfamic, and the like. Some of these salts may be preferable to others because of differences in corrosive properties or other properties peculiar to the particular salt.

The invention claimed is:

1. A method for inhibiting the growth of bacteria, fungi and algae in metal-working lubricants which comprises applying to the growth in said lubricants an amount sufficient to inhibit such growth of the compound 1-aminoethyl-2-naphthenyl imidazoline or a salt thereof selected from the group consisting of the hydrochloric, sulfuric, phosphoric, acetic, lauric, oleic, gluconic, oxalic, tartaric, citric, benzoic, paratoluene sulfonic and sulfamic acid salts.

References Cited
UNITED STATES PATENTS

| | | | |
|---|---|---|---|
| 3,705,027 | 12/1972 | Adams et al. | 71—67 |
| 3,251,662 | 5/1966 | Fareri et al. | 44—63 |
| 3,231,494 | 1/1966 | Morway | 252—34 X |
| 3,187,003 | 6/1965 | McBride | 252—51.5 AX |
| Re. 23,227 | 5/1950 | Blair et al. | 252—8.55 E |
| 2,214,152 | 9/1940 | Wilkes | 252—51.5 A X |

PATRICK P. GARVIN, Primary Examiner

A. H. METZ, Assistant Examiner

U.S. Cl. X.R.

44—63; 252—34, 49.5, 51.5 A